Dec. 6, 1960    H. S. STINSON    2,962,833
ATTACHMENT FOR FISHHOOKS
Filed April 16, 1958

INVENTOR
Harold S. Stinson

United States Patent Office 2,962,833
Patented Dec. 6, 1960

2,962,833

ATTACHMENT FOR FISHHOOKS

Harold S. Stinson, Town and Country, Mo.
(11777 Clayton Road, St. Louis 22, Mo.)

Filed Apr. 16, 1958, Ser. No. 728,938

3 Claims. (Cl. 43—44.6)

The invention has to do with the art of fishing and refers particularly to an improved method of attaching bait to a fish-hook.

The principal object of the invention is to provide a fish-hook which will hold a live minnow, or other types of bait, securely in position adjacent the fish-hook and includes an improved type of clamp which is easy to operate, simple in construction, and cheap to manufacture.

Other objects and advantages resides in the details of construction of the invention which is designed for simplicity, economy, and efficiency.

I do not limit the invention to the embodiments shown as the mechanical method of achieving this novel result may be modified in many ways without deviating from the spirit of the invention or the scope of the claims.

In the drawing Figure 1 is a side elevational view of a preferred embodiment of the bait holding fish-hook, shown in its normal position.

Figure 3:
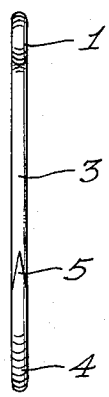
Figure 3 is a front elevational view of the bait holding fish-hook.
Figure 1:
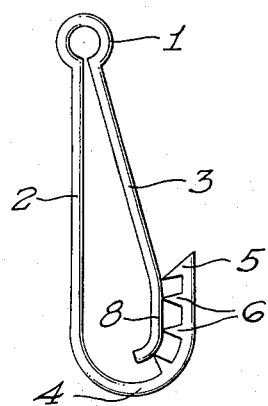
Figure 2:
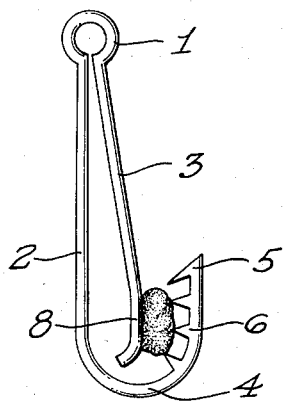
Figure 2 is a side elevational view the same as in Figure 1 with the exception that the bait holding fish-hook is shown with bait in position.

In the present instance, the bait holding fish-hook is composed of a single piece of spring-wire material which is bent between its extremities to form a circular loop designated by the numeral 1, which serves as the line-attaching end. One of the extremities of said loop 1 extends to form the shank 2 of a fish-hook having a bend 4 and a burr 5. Extending from the other extremity of said loop 1 is the shank 3 of a bait clamping member 8. This shank starts as above explained from the extremity of the loop 1 and it then converges in a direction toward the burr 5 and, naturally, is inclined away from the shank 2 of the fish-hook and forms an angle with it. Approximately at the point where the shank 3 meets the burr 5 it is bent to conform with the shape of that part of the bend of the hook which lies downwardly from the burr 5, which for the sake of clarity I desire to call the burr side of the bend of the hook. This bent portion 8 of the shank 3 is normally in contacting engagement with the inside of the burr side of the fish-hook. In the present embodiment of the invention, burrs 6 are provided along the inside surface of the burr side of the bend of the hook, for the purpose of engaging bait.

It will readily be understood by those skilled in the art that the operation of the device, the line-attaching end loop 1 may be held in one hand and the bait placed between the burr side of the hook and the clamping member 8 by exerting pressure against the outside edge of the shank 3 thereby wedging the clamp open to accommodate the particular bait used. Of course, many fishermen will find it equally as desirable to simply press the shanks 2 and 3 together which will cause the clamping member 8 to separate from the burr side of the bend of the hook and permit the introduction of the bait, and, after it has been placed in the position desired the shanks 2 and 3 may be released and the sharp points of the burrs 6 will engage the bait and hold it in place.

Figure 4:
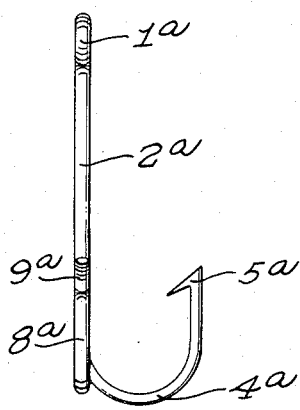
Figure 4 is a side elevational view of a modified form of the invention.
Figure 5:
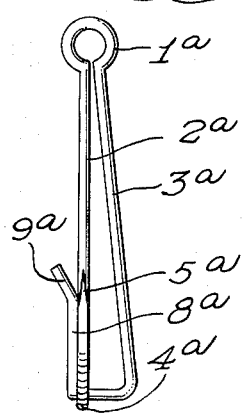
Figure 5 is a front elevational view of the modified form of same.

Figures 4 and 5 show a modification of the invention, which will now be described.

Similar to the embodiment of the invention hereinabove described this modification of the same may be made of a single piece of spring-wire material which is bent between its extremities to form a circular loop 1a which forms the line-attaching end of the fish-hook. Extending from one of the extremities of said loop 1a is a shank 2a of an ordinary fish-hook, having a bend 4a and a burr 5a. Extending from the other extremity of said loop 1a is the shank 3a of a bait clamping member 8a which shank 3a converges at an angle inclining away from the shank 2a of the fish-hook. At a point, approximately, at the extremity of the shank 2a the shank 3a is bent inwardly under the bottom of the shank 2a and then extends upwardly on the opposite side of the shank 2a of the fish-hook. The portion of the clamping member designated 8a is normally in contacting engagement with the lower portion of the shank 2a and the upper extremity of the member 8a inclines away from the shank of the fish-hook 2a forming an inclined face 9a.

As in the previous described embodiment of the invention, bait may be introduced into the device by pressing together the shanks 2a and 3a which will cause the clamping member 8a to separate from the lower portion of the fish-hook and permit the introduction of bait. Bait may also be introduced by wedging the bait between the inclined face 9a and the shank of the fish-hook 2a.

It is to be understood that the foregoing description and the accompanying drawing is a simple diagrammatic illustration and example, and that changes and alterations in the present disclosure, which will be readily apparent to one skilled in the art, are contemplated as within the spirit of the present invention and the scope of the claims.

What I claim is:

1. A fish-hook comprising a shank having a reversely bent portion to provide a hook portion, said hook portion having a barb, a plurality of burrs formed on said hook portion and projecting outwardly therefrom toward said shank in such a manner as to lie in the same plane as the shank, and a bait clamping element in said plane for clamping bait against said burrs, said bait clamping element having one end integrally connected by a resilient loop to the free end of said shank, said bait clamping element having its other end formed to resiliently engage and normally bear against the tips of said burrs in such a manner that it may be moved out of position by insertion of bait between said burrs and itself to yieldably clamp the bait against the burrs.

2. A fish-hook comprising a shank having a reversely bent portion to provide a hook portion, said hook portion having a barb, a plurality of bait engaging means formed on said hook portion and projecting outwardly therefrom toward said shank, and a bait clamping element for clamping bait against said plurality of bait engaging means, said bait clamping element having one end integrally connected by a resilient loop to the free end of said shank, said bait clamping element having its other end formed to resiliently engage and normally bear against said plurality of bait engaging means in such a manner that it may be moved out of position by insertion of bait between said plurality of bait engaging means and itself to yieldably clamp the bait against said plurality of bait engaging means.

3. A fish-hook comprising a shank having a reversely bent portion to provide a hook portion, said hook portion having a barb, a plurality of bait engaging means formed on said hook portion and projecting outwardly therefrom toward said shank in such a manner as to lie in the same plane as the shank, and a bait clamping element in said plane for clamping bait against said plurality of bait engaging means, said bait clamping element having one end integrally connected by a resilient loop to the free end of said shank, said bait clamping element having its other end formed to resiliently engage and normally bear against said plurality of bait engaging means in such a manner that it may be moved out of position by insertion of bait between said plurality of bait engaging means and itself to yieldably clamp the bait against said plurality of bait engaging means.

References Cited in the file of this patent

UNITED STATES PATENTS

| | | |
|---|---|---|
| 754,349 | Scott | Mar. 8, 1904 |
| 821,544 | Scott | May 22, 1906 |
| 1,323,394 | Jones | Dec. 2, 1919 |
| 1,717,190 | Coleman | June 11, 1929 |
| 2,078,162 | Robins | Apr. 20, 1937 |
| 2,234,516 | Clark | Mar. 11, 1941 |